United States Patent [19]
Fredrick et al.

[11] Patent Number: 4,873,616
[45] Date of Patent: Oct. 10, 1989

[54] POWER SUPPLY FOR ARC LAMPS

[75] Inventors: William Fredrick, Valencia; Robert Brent, Saugus; Peter Baldwin, Costa Mesa, all of Calif.

[73] Assignee: Camera Platforms International, Inc., Valencia, Calif.

[21] Appl. No.: 53,271

[22] Filed: May 21, 1987

Related U.S. Application Data

[63] Continuation-in-part of Ser. No. 39,044, Apr. 16, 1987.

[51] Int. Cl.[4] .......... H02M 3/335

[52] U.S. Cl. .......... 363/17; 363/98; 363/124; 363/132; 323/266; 315/DIG. 7

[58] Field of Search .......... 363/17, 24–26, 363/98, 132, 133–134; 323/266; 315/DIG. 5, DIG. 7

[56] References Cited

U.S. PATENT DOCUMENTS

| | | | |
|---|---|---|---|
| 3,641,422 | 2/1972 | Farnsworth et al. | 323/224 |
| 3,737,755 | 6/1973 | Calkin et al. | 363/17 |
| 4,257,090 | 3/1981 | Kroger et al. | 363/65 |
| 4,471,269 | 9/1984 | Ganser et al. | 315/DIG. 7 |
| 4,481,460 | 11/1984 | Kroning et al. | 323/266 |
| 4,482,848 | 11/1984 | Heal et al. | 363/124 |
| 4,485,434 | 11/1984 | Beeston et al. | 363/132 |
| 4,533,986 | 8/1985 | Jones | 323/266 |
| 4,562,527 | 12/1985 | Klamt | 323/266 |
| 4,663,699 | 5/1987 | Wilkinson | 363/98 |
| 4,709,188 | 11/1987 | Roberts | 363/37 |

OTHER PUBLICATIONS

Jon D. Paul, "The Electronic Ballast", PCI '81 proceedings, pp. 467–480.

Jon D. Paul, "Reliability Aspects of Electronic Ballast", pp. 1–11.

*Primary Examiner*—Peter S. Wong
*Attorney, Agent, or Firm*—Ladas & Parry

[57] ABSTRACT

A power supply for an arc lamp. It includes a DC converter which has an input, an output, and a circuit for increasing the voltage received at the input and for supplying the increased voltage to its output. A current sensing circuit is provided for controlling the amount of current delivered to the output. An output "H" bridge is coupled to the output of the DC converter for generating a squarewave in response thereto. The power supply is capable of quickly igniting and re-igniting arc lamps, is relatively inexpensive to manufacture and is relatively light in weight. The power supply can accept either an AC or DC source over a wide voltage range and increases or decreases the input voltage compared to the output voltage.

6 Claims, 6 Drawing Sheets

POWER SUPPLY FOR ARC LAMPS

CROSS REFERENCE TO RELATED APPLICATIONS

This application is a continuation-in-part of co-pending application Ser. No. 039,044 filed Apr. 16, 1987.

BACKGROUND OF THE INVENTION

This invention provides a current controlled AC/DC power supply for arc lamps, such as HMI lamps, mercury vapor lamps, sodium vapor lamps, and the like. Such lamps are used in theatrical productions, on cinematographic stages, for the production of TV shows, in industrial applications, for lighting sporting events and for street and outdoor lighting in general, to name only a few applications. When used in cinematographic, theatrical, and TV applications and sometimes when used in industrial or sporting applications, the lamp selected must have a correct light spectrum characteristic (or color temperature), which often means that it must have the same light spectrum (color temperature) as the sun so that colors appear natural. In such cases, the current supplied by the power supply to the lamp must be carefully controlled in order to provide precise regulation of lamp color temperature.

The prior art power supplies have a number of drawbacks. They tend to be bulky, expensive and slow to ignite or re-ignite the lamp being powered. In the case of power supplies used for theatrical work, cinematographic work or in a TV studio, the power supplies should be preferably portable (and, in the case of the prior art, they were, at best, semi-portable because the were supplies were quite heavy), they should generate flicker free light and need to be able ignite and re-ignite the lamp quickly. In industrial applications, the ability to re-ignite a lamp quickly can also be very important. In a effort to save energy costs, many factories have switched from traditional lamps to arc lamps due to their greater energy efficiency . Power outages can occasionally occur, however, and since the power supplies used to power such lamps have required a comparatively long time to restart or re-ignite the lamps, the factory can be without light for a considerable length of time. If it takes more than a few minutes to restart the lamps, then the lost of production at the factory can outweigh the savings from using such lamps.

HMI lamps and other similar lamp types should not be operated on DC (Direct Current) because DC causes erosion of the electrodes resulting in rapid destruction of the bulb. If the lamp is powered by a sinusoidal AC (Alternating Current) waveform, the erosion problem is overcome, but the resulting light emitted varies sinusoidally resulting in the phenomenon known as flicker. Those skilled in the art realize that flicker is undesirable, especially in cinematographic applications. If a square waveform is utilized to power the lamp then both the erosion problem and the flicker problem are overcome. U.S. Pat. No. 4,485,434 teaches how to generate a squarewave using a bridge circuit.

Readily available power sources supply sinusoidal AC. For example, the 120 volt 60 Hertz power available in American homes and industry is sinusoidal AC. On cinematographic stages DC power has traditionally been available. It is well known to convert sinusoidal AC to DC by means of a simple rectifier and filter device. A converter device is then used to obtain the proper current and voltage for the lamp.

Preferably, a power supply for arc lamps should be able to be powered from either AC or DC sources of wide voltage ranges. In particular, the power supply should be functional even when the input voltage is less than the voltage required to ignite and run the arc lamp. Moreover, the power supply should be light weight, cost effective to manufacture and yet provide sufficient power resources to quickly ignite or reignite the arc lamp.

BRIEF DESCRIPTION OF THE INVENTION

Briefly, and in general terms, the instant invention provides a power supply for an arc lamp, which has a DC converter with and input, and output. The DC converter is capable of increasing the voltage received at its input and supplies the increased voltage to its output. A current sensing circuit is provided for controlling the amount of current delivered to the output. An output "H" bridge is coupled to the output of the DC converter for generating a squarewave.

In the disclosed embodiment, the bridge circuit includes four separate switches which are turned on and off so that the output load on the bridge (the lamp) receives power in one polarity or the other alternatively. The converter preferably includes an autotransformer driven by four power MOSFET transistors in a bridge configuration. The transformer output is then rectified and filtered to create a DC source for the "H" bridge. The four switches are turned on and off by a pulse width modulator control circuit to vary the DC output power in accordance with lamp requirements. The lamp current is sensed and supplied to an amplifier which then supplies a signal to the pulse width modulator control circuit forming a control loop to keep the lamp voltage and current precisely fixed. This allows the lamp color temperature to be accurately regulated and the lamp to be operated without varying intensity level regardless of input power variations. Further, a wide range of either AC or DC power sources may be utilized as the original power input for the device. The output voltage can be either higher or lower than in source voltage to the power supply. The power supply, even when sized to power a 4000 watt arc lamp, can be carried by one person.

DESCRIPTION OF THE DRAWING

The novel features which are believed to be characteristic of the invention are set forth in the appended claims. The invention itself, however, both as to its construction and its method of operation and use, together with the objects and features thereof, will be best understood from the following detailed description of a preferred embodiment when read in conjunction with the accompanying drawing, wherein:

DETAILED DESCRIPTION OF A PREFERRED EMBODIMENT

Figure 1:
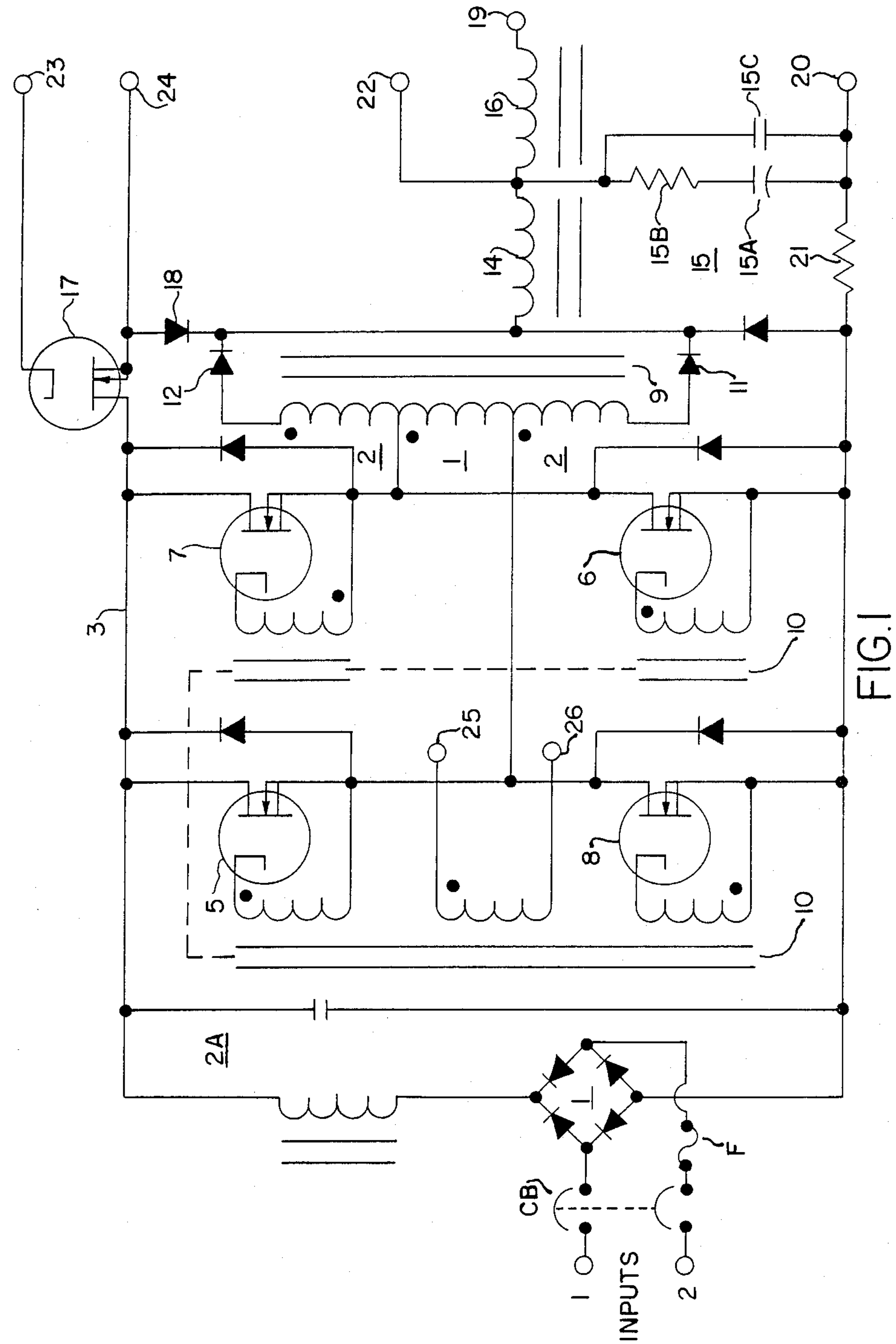
FIG. 1 is a circuit diagram of the DC converter device.

FIG. 1 is a schematic diagram of a DC converter. Incoming AC or DC is applied via Inputs 1 and 2, a circuit breaker CB, and a fuse F to a full wave diode rectifying bridge 1. The polarity of incoming DC applied at Inputs 1 and 2 is not particularly important since rectifying bridge 1 will correct the polarity, if required. Rectifying bridge converts the incoming AC to DC (if the input is AC) or merely passes incoming DC. The DC output from the bridge 1 appears at a bus 3, 4, and is smoothed, if necessary, by a filter 2 comprising a choke inductor and a capacitor.

The DC passing or converted by rectifying bridge 1 is thereafter converted to AC by an oscillator circuit which includes MOSFETs (Metal Oxide Silicon Field Effect Transistors) 5–8. The AC voltage is stepped up by an autotransformer 9 and thereafter reconverted back to DC, which appears at an output bus 19, 20.

The four MOSFET switches 5, 6, 7 and 8 of the oscillator circuit are arranged in a bridge configuration in which only one pair of MOSFETs are gated on and therefore conducting at any given time (that is, at most, only one pair of MOSFETs, either MOSFETs 5 and 6 or 7 and 8 are conducting at any given time) causing current to alternate in the winding of an autotransformer 9. The conduction by the MOSFET switches 5–8 is pulse width modulated at a high frequency (preferably greater than 15 KHz so as to be inaudible and more preferably about 30 KHz) by controlling the gates of MOSFET switches 5–8 by a gate drive transformer 10 which is driven a control circuit which will be subsequently described with reference to FIG. 2. Autotransformer 9 steps up the voltage received at its input and the resulting alternating current flows through and is rectified by diodes 11 and 12 connected at the output of autotransformer 9. A filter, in this case a "T" filter comprising an inductor 14, capacitor 15 and inductor 16, filters and smooths the DC generated by diodes 11 and 12.

Capacitor 15 is preferably a 2000 mfd 300 V DC capacitor, while inductor 14 is preferably a 300 MicroHenry choke and inductor 16 is preferably a 100 MicroHenry choke. The size of the capacitor is relatively large while the size of the inductors is relatively small. The reason for this relationship will be addressed subsequently.

During the time MOSFETs 5–8 are not conducting, current can be supplied to the filter 14, 15, 16 through an additional MOSFET 17 and diode 18. DC flows from output 19 of the DC converter to the input of an "H" bridge, which will be subsequently described with reference to FIG. 3. The DC returns via return 20 and then flows through a current sensing resister 21 back to bus 4. The voltage drop generated across the current sensing resistor 21 is applied to the gate drive control circuit of FIG. 2 and, as will be seen, is used to control the pulse width modulation applied to the MOSFET gates 5–8 through transformer 10. Since the voltage drop across sensing resistor 21 is proportional to the current being supplied by the power supply, the pulse width modulation of MOSFETs 5–8 by the gate drive circuitry of FIG. 2 effectively controls the amount of current delivered by the power supply to the lamp. As previously mentioned, controlling the current to the lamp means that its color temperature is being controlled.

MOSFET switch 17 is gated on when the output voltage of the DC converter is higher than its input voltage and off when the output voltage is less than its input voltage. Current is pumped to the output of the converter when MOSFET switch 17 is on (i.e. when the output voltage is higher than the input voltage) during portions of the flyback of autotransformer 9 thereby increasing the efficiency of the circuit. Thus, MOFFET switch 17 reduces the amount of power required to be converted by the bridge MOSFETS 5, 6, 7 and 8 during normal running of the lamp when gated on or allows operation of the lamp at reduced voltage levels during warm up when gated off. As will be discussed subsequently, MOSFET 17 also provides additional power during the re-ignition of a arc lamp, thereby increasing the speed by which such lamps can be re-ignited by the power supply.

The input voltage to the DC converter can be as low as 90 volts and it will still function properly. Lower voltages can be accommodated, if desired, by changing the winding ratio of autotransformer 9 to yield a higher voltage step up. In the preferred embodiment, the winding ratio of autotransformer is 2:1:2, but these ratio can of course be varied. The maximum voltage which can be accommodated is determined by the ability of the various components to withstand higher voltages. Either AC or DC can be applied to the Inputs 1 and 2. Thus, the power supply is capable of using either AC or DC in a wide range of possible voltages as its source of power.

Figure 2:
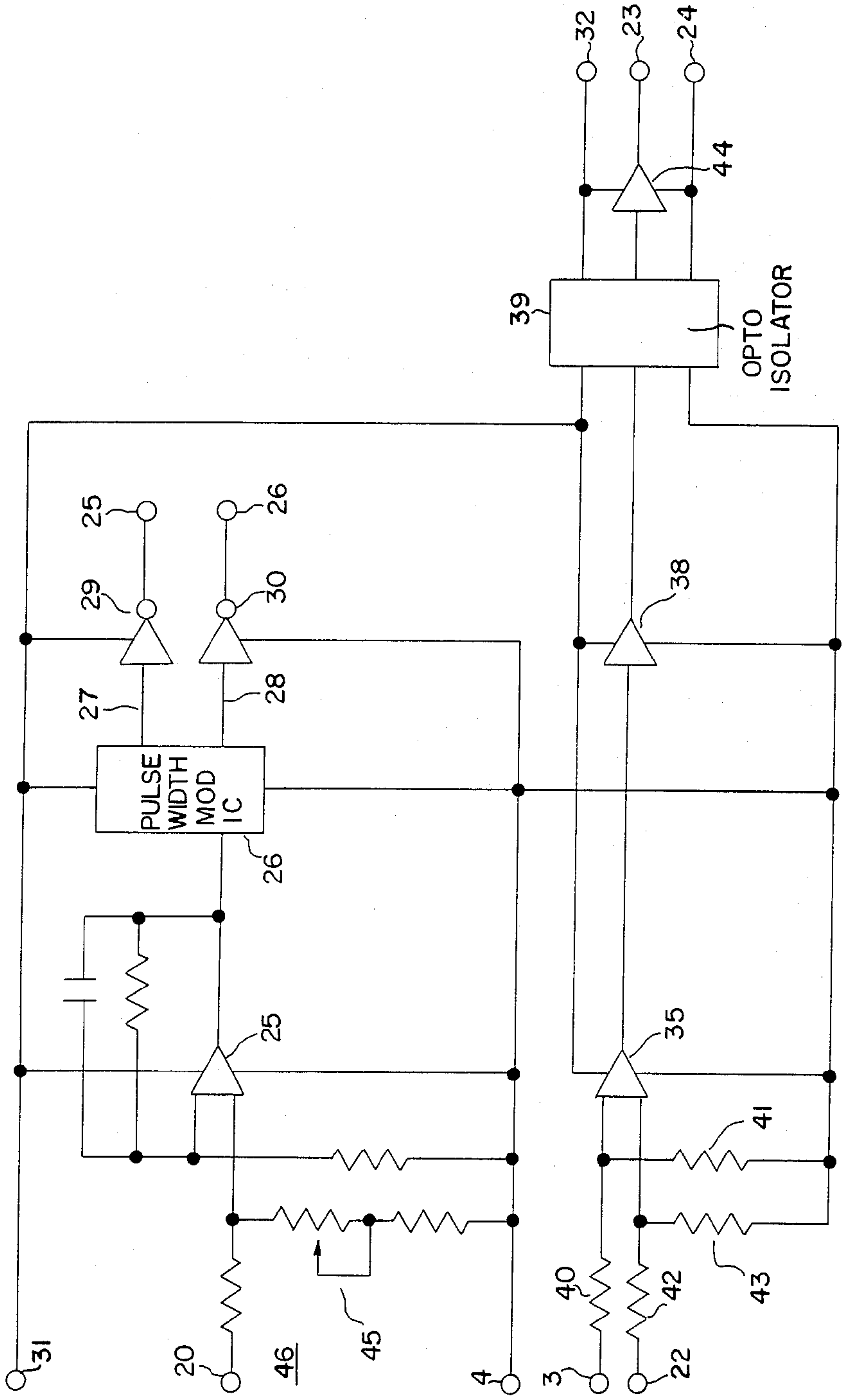
FIG. 2 is a circuit schematic of the gate drive control circuit for the DC converter of FIG. 1.

FIG. 2 is a schematic diagram of the aforementioned gate drive control circuit. This circuit is preferably supplied with stabilized voltage sources isolated from the main power circuits via supply busses 31 and 32. An amplifier Integrated Circuit (IC) 25 receives a portion of the voltage drop generated across current sensing resistor 21 (FIG. 1), and amplifies it. The portion received is controlled and adjusted by a voltage divider 46 which includes a pot 45. The output of IC 25 is applied to a pulse width modulating IC 26, the outputs 27, 28 of which are inverted and buffered by buffer ICs 29 and 30. The outputs of buffer ICs 29, 30 drive the primary winding of gate drive transformer 10. Thus the current supplied by the power supply is controlled by changing the period of time the pairs of MOSFETs 5 and 6 and 7 and 8 are on, i.e., by changing the width of the pulses provided by the gate drive circuitry to the gates of MOSFETs 5–8.

The preferred type numbers (model numbers) and manufacturers of ICs 25 and 26, and indeed of all the major ICs used in the disclosed power supply are listed in Table I.

The voltage on bus 3, which is the input voltage to the DC converter, is applied via a voltage divider formed by resistors 40, 41 to one input of a comparator IC 35. The divider supplies a portion of the voltage on bus 3 to IC 35, the portion being within the normal input range of comparator IC 35. Similarly, the voltage outputted by the DC converter at node 22 is divided by resistors 42, 43 and applied to the other input of IC 35. The state of the comparator IC then indicates whether the input voltage is higher or lower than the output voltage of the DC converter. The output of comparator IC 35 is applied via a buffer IC 38 to an optologic isolator IC 39. The output of the isolator IC 39 amplified by a buffer IC 44 and applied to the gate 24 and source 23 of MOSFET transistor 17 (FIG. 1) so that it is turned on or off in response to the comparative levels of the input and output voltage of the power supply. As previously discussed, MOSFET 17 is gated on when the output voltage of the DC converter is greater than its input voltage and off when the output voltage is less than the input voltage.

Figure 3:
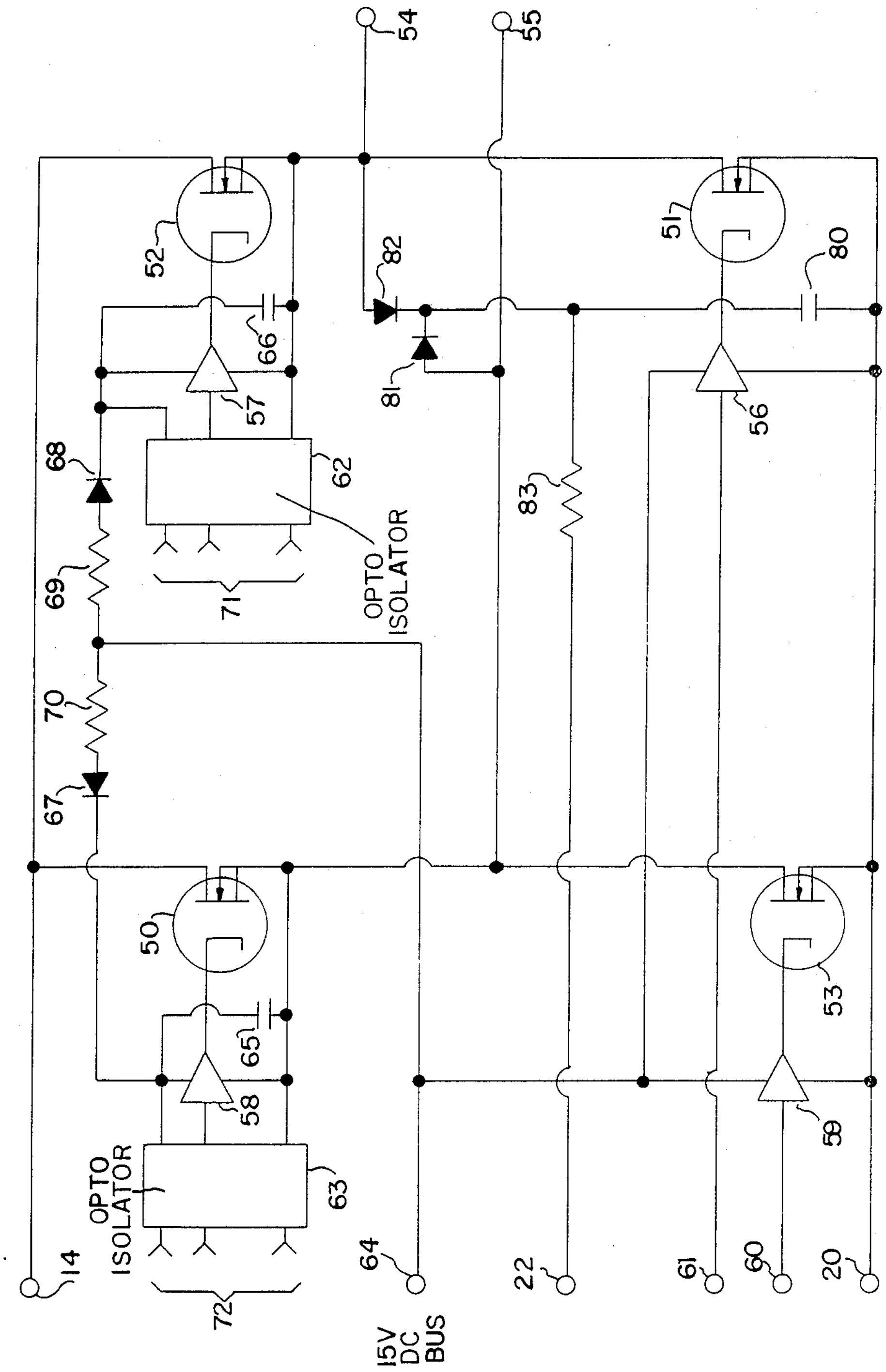
FIG. 3 is a circuit schematic of an "H" bridge which is connected to the output of the converter of FIG. 1.

The schematic diagram of "H" bridge circuit is shown in FIG. 3. MOSFET transistor switches 50, 51, 52 and 53 are alternately turned on and off in pairs so that the DC converter output current applied at bus 19, 20 is caused to flow in alternating directions through the lamp head 95 (FIG. 5) which is connected at output terminals 54 and 55. MOSFETs 50 and 51 cause the lamp current to flow in one direction and MOSFETs 52 and 53 cause it to flow in the other direction. The gates of the MOSFETs are driven by buffer ICs 56, 57, 58 and 59. Buffer ICs 56 and 59, which drive the lower MOSFETs 51, 53 in the "H" bridge, are driven alternatingly at nodes 60, 61 directly from a bridge control circuit which will subsequently be described with reference to FIG. 4. The buffer ICs 57, 58 for the upper MOSFETs 52, 50 are driven by optologic isolators ICs 62 and 63. The bias power for buffer ICs 57 and 58 and the output side of the optologic isolator ICs 62 and 63 is preferably derived from the "H" bridge control circuit bias power which is connected at node 64. This bias power is stored in capacitors 65 and 66 which are charged through diodes 67 and 68 and current limiting resistors 69 and 70. This charging action occurs when the corresponding lower MOSFET is switched on. The optologic amplifier devices 62, 63 are alternatingly driven by the "H" bridge control circuit of FIG. 4.

An output clamping circuit is connected across terminals 54 and 55. It includes a capacitor 80, diodes 81 and 82 and a bleeder resistor 83. This clamp circuit protects MOSFETs 50–53 from voltage transients and spikes which can and will occur at terminals 54 and 55. Such spikes arise from the fact the arc lamp 100 typically is installed in a head 95 (FIG. 5) which has inductive components therein which generate voltage spikes when driven with a squarewave. A positive gong spike is shunted to capacitor 80 by diode 81 or 82. The charge on capacitor 80 is maintained by coupling capacitor 80 to capacitor 15 (FIG. 1) via node 22 and resistor 83. Positive going spikes will charge capacitor 80 to a higher potential than that which normally exists on capacitor 15, but resistor 83 will discharge the difference before the next spike occurs.

Figure 4:
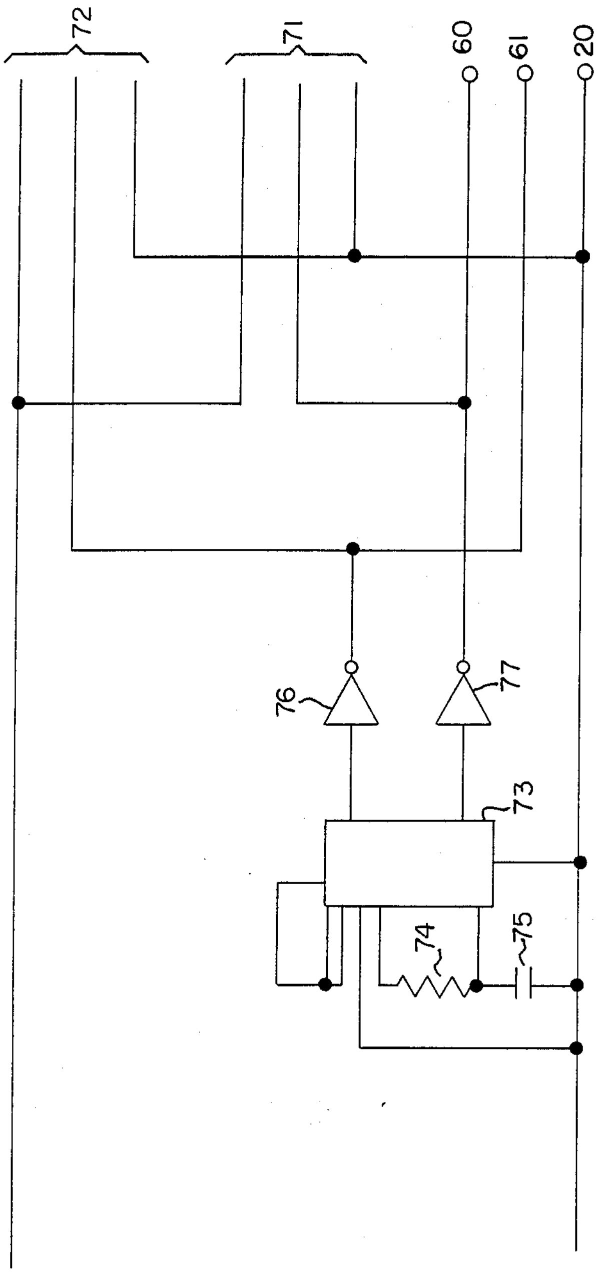
FIG. 4 is a circuit schematic of the control circuit for the "H" bridge circuit of FIG. 3.

Turning now to FIG. 4, which is a schematic diagram of the control circuit for the "H" bridge of FIG. 3, this control circuit has a pulse width control IC 73 which is preferably wired for maximum pulse width. Its frequency of operation, nominally 60 Hz, is set by resistor 74 and capacitor 75. Its outputs are connected to inverting buffer ICs 76 and 77. These outputs and power supply lines 78, 80 are coupled to the optologic isolators ICs 62 and 63 of FIG. 3 via control busses 71 and 72. Thus, the outputs of the inverting buffer ICs 76, 77 drive the various inputs of the "H" bridge circuit, that is, the inputs of buffer ICs 56 and 59 and the inputs of optologic amplifier ICs 62 and 63 (FIG. 3).

Normally, the pulse width control IC 73 has no overlap in the control signals which it outputs. Overlap is purposefully caused to occur in the preferred embodiment by coupling the outputs of IC 73 via inverting buffer ICs 76 and 77. By doing this, the control signals from ICs 76 and 77 overlap each other and therefore the at the time of the changeover from one pair of MOSFETs (e.g. MOSFETs 50 and 51) to the other pair (e.g. MOSFETs 52 and 53) or visa versa, all four MOSFETs 50–53 are gated on at the same time. See the lines labeled A and B on the timing diagram of FIG. 6. The overlapping control signals, shown at C, effectively short circuit the output terminals 54 and 55 together for a short time period during the change in polarity of the squarewave. The time period of the overlap is less than ten microseconds (the time period is exaggerated in the timing diagram of FIG. 6 for the sake of clarity). This shorting helps to reduce spikes which are generated when the current is quickly switched in a inductive load, and the head 95 has inductive components as previously discussed. Spikes which still occur are handled with the previously described clamp circuit.

Figure 6:
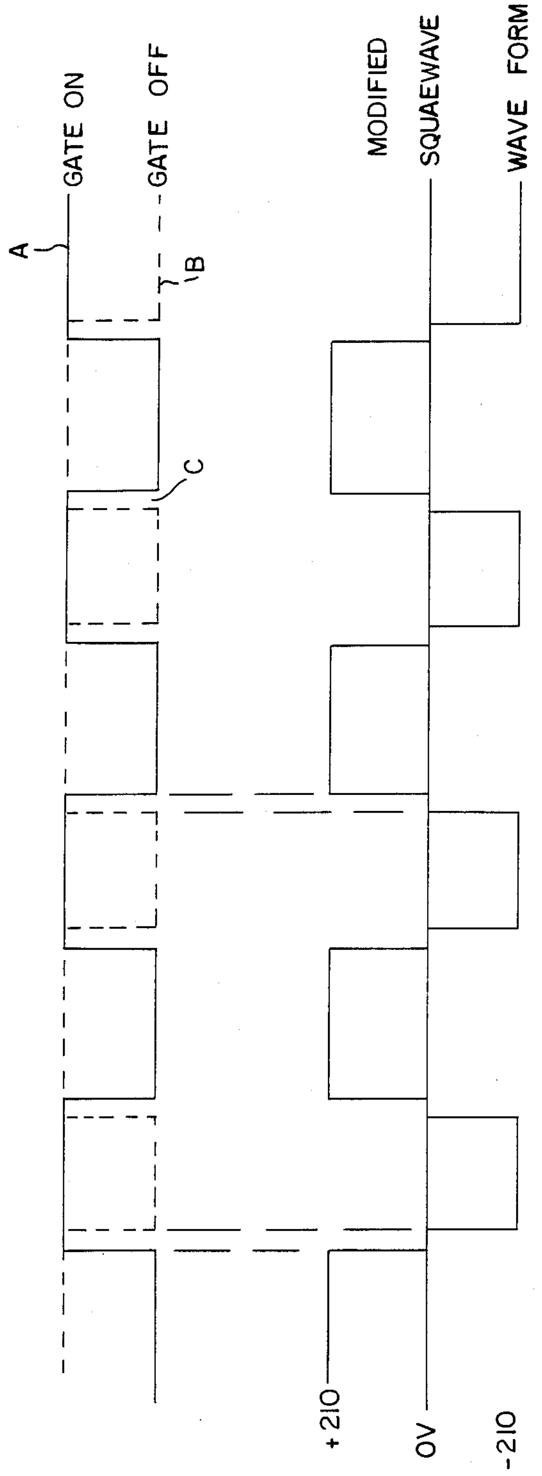
FIG. 6 depicts the timing of the gating of the MOSFETs in the "H" bridge and the modified squarewave generated thereby.

The output applied to the lamp at terminals 54, 55 is therefore a modified 60 Hz squarewave which is depicted in FIG. 6. The maximum positive and negative voltage of the wave is equal to the voltage on bus 17, 18 (less the voltage drops across the conducting MOSFET switches 50, 51 or 52, 53) and short periods of zero voltage occur between the positive and negative transitions.

Operation

Figure 5:
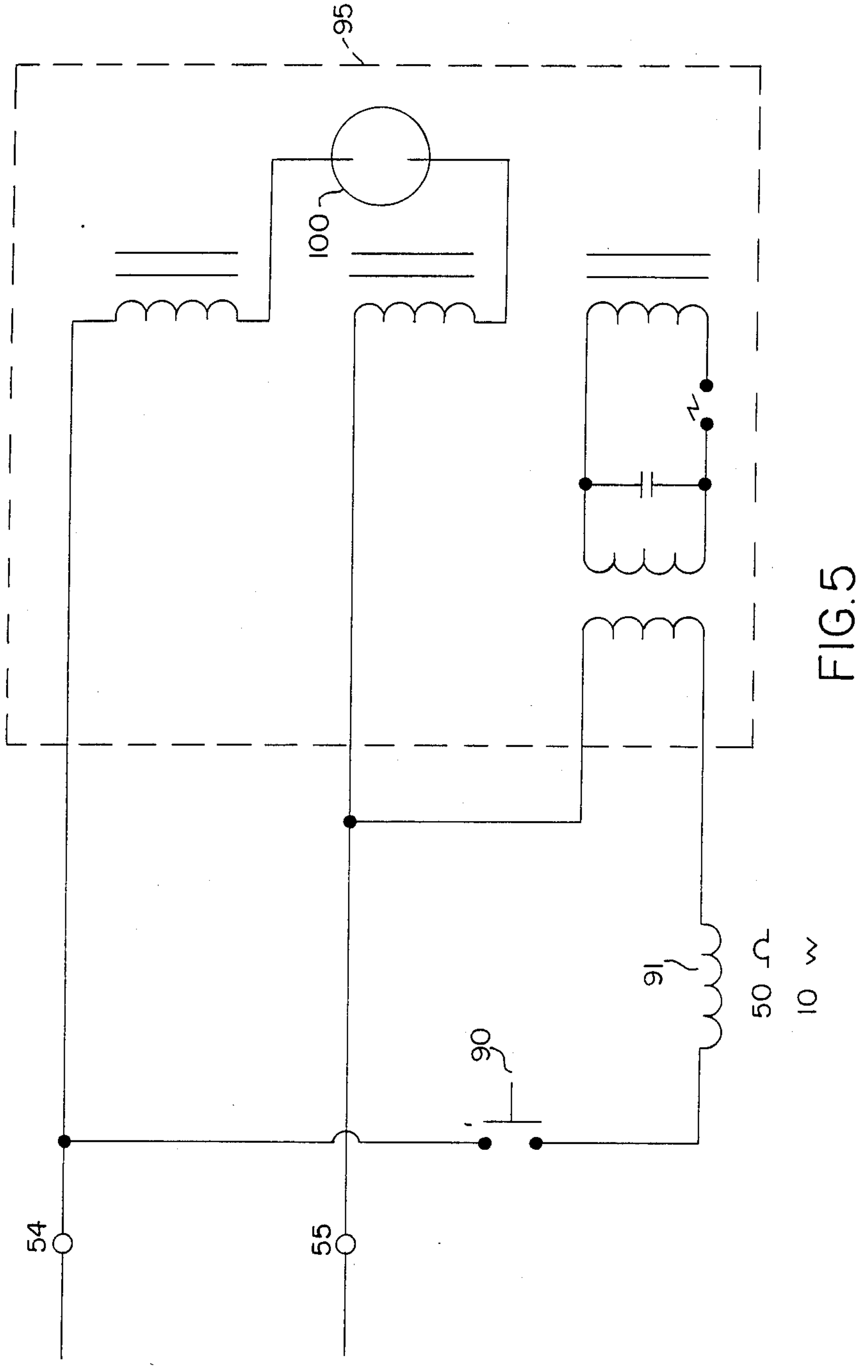
FIG. 5 is a schematic diagram of an arc lamp head.

Assuming that the power supply is connected to a 120 volt source (either AC or DC) and to an arc lamp head 95 such as that depicted in FIG. 5, the voltage which must be generated to efficiently ignite the arc lamp 100 is on the order of 230 volts (as an AC squarewave, preferably modified as previously discussed). At this point, MOSFETs 5–8 will be oscillating and MOSFET 17 will be on to pump additional power into the lamp. At ignition, the output voltage will drop to approximately 30 volts, causing MOSFET 17 to turn off. The output voltage from the power supply will rise to approximately 120 volts in 30 to 40 seconds. As the output voltage of the power supply exceeds its input voltage, MOSFET 17 is again turned on by its gate control circuit and MOSFET 17 will then again supply additional power to the arc lamp. The voltage will continue to rise to a steady state condition where the output voltage is approximately 210 volts. The time required to ignite a 4000 watt arc lamp (model Daymax DMI 4000 manufactured by ILC) and come to is approximately 90 seconds or less. Those skilled in the art will appreciate that this is much faster than with prior art power supplies.

If the arc lamp 100 is de-energized or becomes extinguished, and while it is still physically hot (i.e. it only was recently de-energized or extinguished), the arc lamp 100 can be brought back to full power (and therefore full intensity light) in approximately ten seconds. In ten seconds, capacitor 15 is recharged to the maximum voltage available from the power supply, which will likely be 235 volts or greater. At the same time, MOSFET 17 is on, thereby permitting the power supply to supply the necessary surge of current to re-ignite the arc lamp which is supplied when the re-ignite switch 90 is briefly closed and thereby connecting the voltage at output terminals 54 and 55 through a resistor 91 to an ignition coil in head 95. The charge stored in capacitor 15 is dumped very quickly into the lamp, causing it to quickly re-ignite. Since the inductance of inductor 16 is relatively small, it offers little impedance to the surge of current provided by capacitor 15. The lamp 100 will promptly re-ignite and come to full power if the user waits approximately 10 seconds before momentarily closing switch 90. Those skilled in the art will appreciate that prior art supplies typically require more than one minute to re-ignite an arc lamp.

Having described the invention in connection with a preferred embodiment, modification will now suggest itself to those skilled in the art. The invention is not intended to be limited to the disclosed embodiment, except as required by the appended claims.

TABLE I

PREFERRED INTEGRATED CIRCUIT DEVICES

| Item Number(s) | Part Number | Description | Manufacturer |
|---|---|---|---|
| 25 | LM358 | Dual Differential Input Operational Amplifier | Motorola |
| 26, 73 | SG3525 | Pulse Width Modulator | Motorola |
| 29, 30, 38, 56, 57, 58, 59, 76, 77 | CD4049 | CMOS Hex Invertor | RCA |
| 35 | LM339 | Quad Comparator | Motorola |
| 39, 62, 63 | 740L6010 | Optologic Opto-coupler | General Instrument |
| 44 | CD4050 | CMOS Hex Buffer | RCA |

What is claimed is:

1. A power supply for an arc lamp, comprising:
(a) a DC converter having an input, an output, four electronic switches arranged in a bridge configuration, a transformer coupled to said electronic switches, a gate drive control circuit for controlling said electronic switches, said gate drive control circuitry alternatingly turning on opposing pairs of said electronic switches in said bridge configuration so as to reverse the direction of current flow through said transformer, rectifying means connected to said transformer and to said output of said DC converter, another electronic switch coupling the input of said DC converter to the output of said transformer and gate control means for controlling said another electronic switch so as to turn said another electronic switch on when the output voltage of said converter is greater than its input voltage;
(b) an output bridge coupled to the output of the DC converter for generating a square wave in response thereto for supply to said arc lamp at a normal operations voltage; and
(c) means for reigniting the arc lamp quickly after the lamp has become de-energized, said reigniting means including a capacitor coupled to said output and means for charging said capacitor to a voltage higher than the normal operating voltage of said arc lamp.

2. The power supply of claim 1, further including an output clamp circuit connected to an output of said output bridge, said clamp circuit including a clamp capacitor and a bleed resister, the bleed register draining charge off said clamp capacitor into said capacitor in said reigniting means.

3. The power supply of claim 1, further including an output filter connected to said output of said DC converter, said filter including a pair of inductors and a capacitor, the capacitor of said output filter and the capacitor of said reigniting means being the same capacitor.

4. The power supply of claim 3, wherein one of said pair of conductors is coupled in series between said capacitor and said output bridge circuit, the inductance of said one of said inductors being at least twice the inductance of the other of said pair of inductors.

5. The power supply of claim 1, wherein said output bridge includes:
(a) four transistors arranged in an H bridge and coupled to the output of the DC converter;
(b) control means for controlling the control electrodes of said four transistors, said control electrodes alternating the turning of all four transistors, followed by one pair of said transistors, followed by all four transistors, followed by the other pair of said transistors; and
(c) an output clamp circuit connected to said four transistors.

6. A power supply for an arc lamp, comprising:
(a) a DC converter having an input, an output, four electronic switches arranged in a bridge configuration, a transformer coupled to said electronic switches, a gate drive control circuit for controlling said electronic switches, said gate drive control circuitry alternatingly turning on opposing pairs of said electronic switches in said bridge configuration so as to reverse the direction of current flow through said transformer, rectifying means connected to said transformer and to said output of said DC converter, another electronic switch coupling the input of said DC converter to the output of said transformer and gate control means for controlling said another electronic switch so as to turn said another electronic switch on when the output voltage of said converter is greater than its input voltage; and
(b) an output bridge coupled to the output of the DC converter for generating a square wave in response thereto, said output bridge including:
(i) four transistors arranged in an H bridge and coupled to the output of the DC converter;
(ii) control means for controlling the control electrodes of said four transistors, said control electrodes alternating the turning on all four transistors, followed by one pair of said transistors, followed by all four transistors, followed by the other pair of said transistors; and
(iii) an output clamp circuit connected to said four transistors.

* * * * *